(12) United States Patent
Cole et al.

(10) Patent No.: US 6,471,737 B2
(45) Date of Patent: Oct. 29, 2002

(54) UNDERBOOTH POWDER PAINT COLLECTOR

(75) Inventors: David John Cole, Canton; Charlotte E. Kelly, South Lyon, both of MI (US); Richard D. Burke, Norwalk, OH (US); David E. O'Ryan, Clarkston, MI (US)

(73) Assignee: Durr Industries, Inc., Plymouth, MI (US)

( * ) Notice: Subject to any disclaimer, the term of this patent is extended or adjusted under 35 U.S.C. 154(b) by 14 days.

(21) Appl. No.: 09/748,222

(22) Filed: Dec. 26, 2000

(65) Prior Publication Data

US 2002/0078668 A1 Jun. 27, 2002

(51) Int. Cl.$^7$ .................................................. B05B 1/28
(52) U.S. Cl. ............................... 55/385.2; 55/DIG. 46; 118/50; 118/326; 454/50
(58) Field of Search .............................. 55/342, 385.2, 55/DIG. 18, DIG. 46; 118/50, 326, DIG. 5; 454/50

(56) References Cited

U.S. PATENT DOCUMENTS

| | | | | |
|---|---|---|---|---|
| 3,168,030 A | * | 2/1965 | Wilhelmsson et al. | 55/DIG. 46 |
| 5,040,482 A | * | 8/1991 | McGuire et al. | 55/DIG. 46 |
| 5,147,422 A | * | 9/1992 | Neeley et al. | 55/DIG. 46 |
| 5,153,034 A | * | 10/1992 | Telchuk et al. | 55/DIG. 46 |
| 5,336,283 A | * | 8/1994 | Horisawa | 55/DIG. 46 |
| 5,692,262 A | * | 12/1997 | Boos et al. | 118/DIG. 5 |
| 5,766,355 A | * | 6/1998 | Josefsson et al. | 118/326 |
| 5,782,943 A | * | 7/1998 | O'Ryan et al. | 55/DIG. 46 |
| 6,010,571 A | * | 1/2000 | Josefsson et al. | 55/DIG. 46 |
| 6,228,154 B1 | * | 5/2001 | Pakkala et al. | 55/DIG. 46 |
| 6,238,451 B1 | * | 5/2001 | Conrad et al. | 55/342 |

* cited by examiner

*Primary Examiner*—David A. Simmons
*Assistant Examiner*—Minh-Chau T. Pham
(74) *Attorney, Agent, or Firm*—Howard & Howard

(57) ABSTRACT

A powder paint reclamation collector includes an upper chamber for collecting powder paint particles from a paint booth and a lower chamber that receives the particles from the upper chamber. A vacuum line communicates with the lower chamber retrieving the particles from the collector and transferring the particles to a reclamation system. An air chamber receives pressurized air from an air supply and communicates with the lower chamber through a porous plate. Air bleeds through the porous plate into lower and upper chambers for fluidizing the paint particles. The porous plate and an air chamber floor angle downward from the lower chamber towards the vacuum line to improve the flow of fluidized paint particles into the vacuum line.

27 Claims, 4 Drawing Sheets

UNDERBOOTH POWDER PAINT COLLECTOR

BACKGROUND OF THE INVENTION

The subject invention relates generally to an improved powder paint reclamation collector for use with a production powder paint application booth.

The application of powder paint has become an increasingly utilized method of painting mass production products, such as automobiles, to reduce volatile organic compound emissions from a production paint facility. A typical powder paint booth includes powder paint reclamation system that increases the paint usage efficiency upwards of ninety five percent. This type of reclamation system includes a reclamation collector positioned beneath each section of the paint booth. A typical reclamation collector includes an upper chamber for separation of process air and powder paint particles from a paint booth and a lower chamber that receives the particles from the upper chamber. A vacuum line is connected with the collector for transferring the particles from the collector to a powder paint reclamation system. To effectively retrieve the particles from the collector, the particles must be maintained in a fluidized or suspended state. Otherwise, the particles will agglomerate, build up in areas not having sufficient fluidization, and ultimately result in paint defects on the painted products.

To overcome these difficulties; presently available collectors include an air chamber that receive pressurized air from an air supply. The air chamber communicates with the lower chamber through a porous plate that dissipates the pressurize air. The pores in the porous plate, or plate density, are sized to prevent paint particles from entering the air chamber while allowing air to exit the air chamber. The porous plate is oriented generally horizontally and parallel to the floor of the air chamber.

While the vacuum line is typically located in the lowermost position of the lower chamber, the entirety of the porous plate is positioned below the vacuum line due to the plate's horizontal orientation. To provide a sufficient amount of fluidizing air pressure, several air inlet lines feed pressurized air into the air chamber. The additional air inlet lines are required to prevent an agglomeration of paint particles in areas that are distant from the vacuum line and otherwise would not receive adequate fluidization.

Thus, it would be desirable to reorient the porous plate and the air chamber floor to improve the transfer of fluidized paint particles to the vacuum line for preventing the buildup of paint particles in the lower chamber.

SUMMARY OF THE INVENTION AND ADVANTAGES

The subject invention is a powder paint reclamation collector that has been modified to improve the flow of fluidized paint particles into a vacuum line for transfer to a paint reclamation system. The collector includes an upper chamber for collecting powder paint particles from a paint booth. The upper chamber funnels fluidized paint particles to a lower chamber. A vacuum line is connected to the lower chamber retrieving the fluidized particles from the collector and transferring the particles to the reclamation system to be reintroduced to paint application equipment in the paint booth.

An air chamber receives pressurized air preferably from a single air inlet line directed downwardly toward the air chamber floor and is separated from the lower chamber by a porous or semipermeable plate. The porous plate allows air to flow into the lower and upper chambers for fluidizing the paint particles and prevents the particles from entering the air chamber. Thus, the porous plate has pores or openings therethrough which are smaller than the diameter or particle size of the powdered paint, but large enough to transmit air therethrough. An air chamber floor and the porous plate angle downward, generally in parallel relation, from the lower chamber towards the vacuum line.

Angling the porous plate and the air chamber floor downward towards the vacuum line facilitates the transfer of paint particles from the collector to the vacuum line. Because the vacuum line is positioned below a substantial portion of the porous plate, gravitational forces will assist the flow of paint particles into the vacuum lines as opposed to contributing to the build up of particles in areas that don't receive adequate fluidizing air turbulence. In the preferred embodiment, the air chamber floor and porous plate are parallel and are angled toward the vacuum outlet at an angle of greater than four degrees. It has been found that it is possible to obtain uniform distribution of air and, therefore, uniform suspension of the powder with one inlet and clean, dry pressurized air pressure (60–80 psi) where the distance between the porous plate and the bottom wall is about 3 inches or less. Further, the orientation of the porous plate in this manner allows for the reduction of the number of air inlet lines necessary to adequately fluidize the paint particles for an efficient transfer through the vacuum line to the reclamation system.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
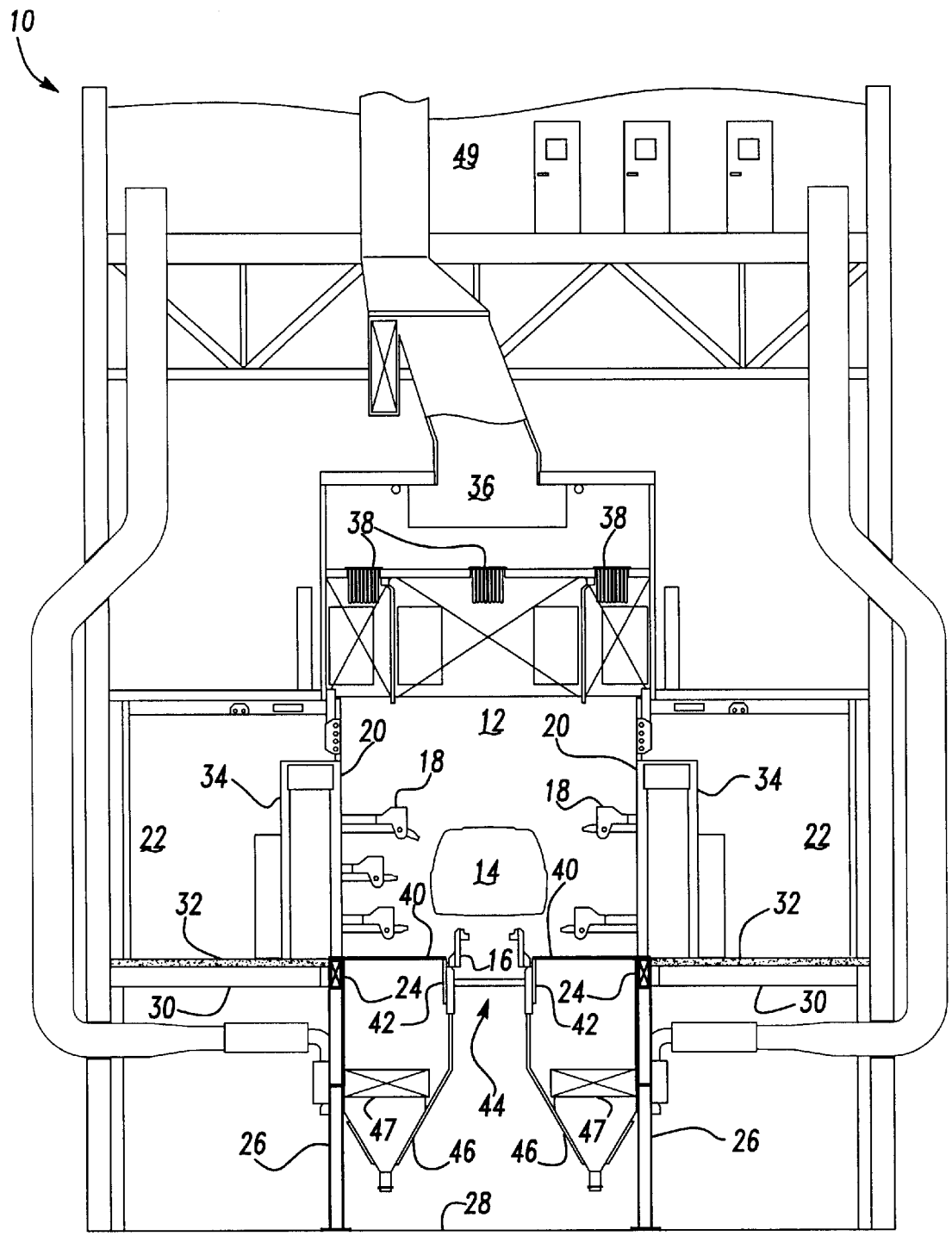
FIG. 1 is a cross-sectional elevation of the paint booth assembly showing the collector of the subject invention.

Referring to FIG. 1, a cross-section of a booth assembly for applying powder paint is generally shown at 10. The booth includes a paint application chamber 12 wherein the powder paint is applied to a vehicle body 14 or other product. The chamber 12 forms an elongated room into which the bodies 14 are conveyed for painting. A conveying device 16, such as, for example a power and free conveyor, moves the products through the application chamber 12.

Paint application equipment 18 is disposed within the chamber 12 for applying the powder paint as is known in the art of powder painting. The chamber 12 is enclosed by opposing walls 20, which separate the chamber 12 from each of the control rooms 22. The walls 20 are supported from below by a plurality support members 24 that are arranged end to end along the entire length of the assembly 10. At least two frame posts 26 are affixed beneath each of the support members 24 to support the assembly 10 and to provide distance between the assembly 10 and a base floor 28, the purpose of which will become more evident below.

A plurality of horizontal support beams 30 are affixed to the support members 24 and project outwardly from the assembly 10. A control room floor 32 is formed over the horizontal support beams 30 for supporting control equipment 34 associated with operating the assembly 10.

An air supply plenum 3 6 is affixed above the assembly 10 to provide fresh air to the application chamber 12. Filters 38 are disposed within the plenum 36 to remove impurities from the fresh air that would otherwise result in paint defects on the car body 14. The fresh air provides a down draft to the chamber 12 to force over spray powder paint particles 39 downward and out of the chamber 12.

A plurality of grates 40 form the floor of the application chamber 12. The grates 40 are supported on one end by a conveyor support beam 42 and the other end by the support members 24. The conveying device 16 operates in a channel 44 between parallel conveyor support beams 42. The grates 40 allow air from the plenum 38 and paint particles 39 that have not adhered to the body 14 to pass therethrough and into a plurality of reclamation collectors 46 disposed beneath the chamber 12. FIG. 1 shows a collector 46 disposed beneath each of the grates 40 thereby enclosing the bottom of the booth assembly 10. Air is drawn through a filter 47 disposed in each collector and routed through a filter house 49 before being returned to the plenum 36. The filters 47 are periodically pulsed to prevent powder paint particles from accumulating and thereby fouling the filters 47 and to maintain uniformity of the air through the application chamber.

Figure 2:
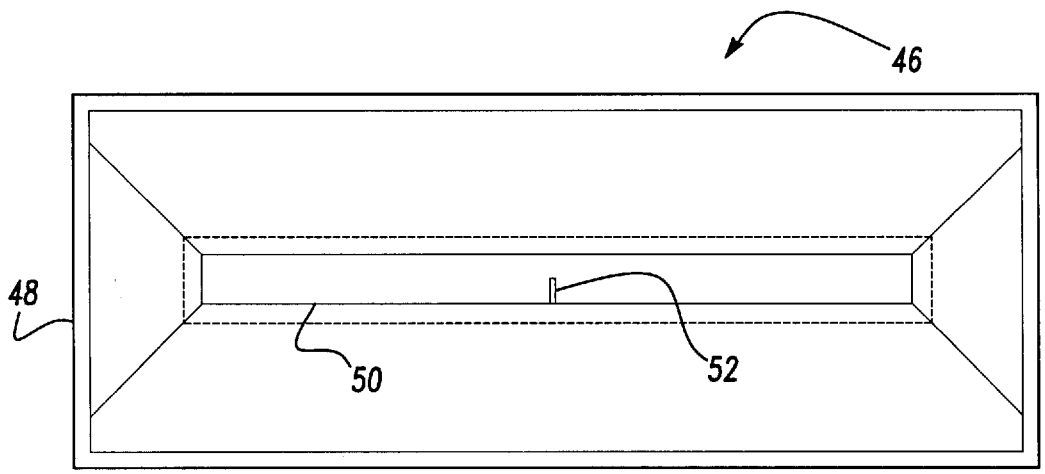
FIG. 2 is a top view of the collector of the subject invention.
Figure 3:
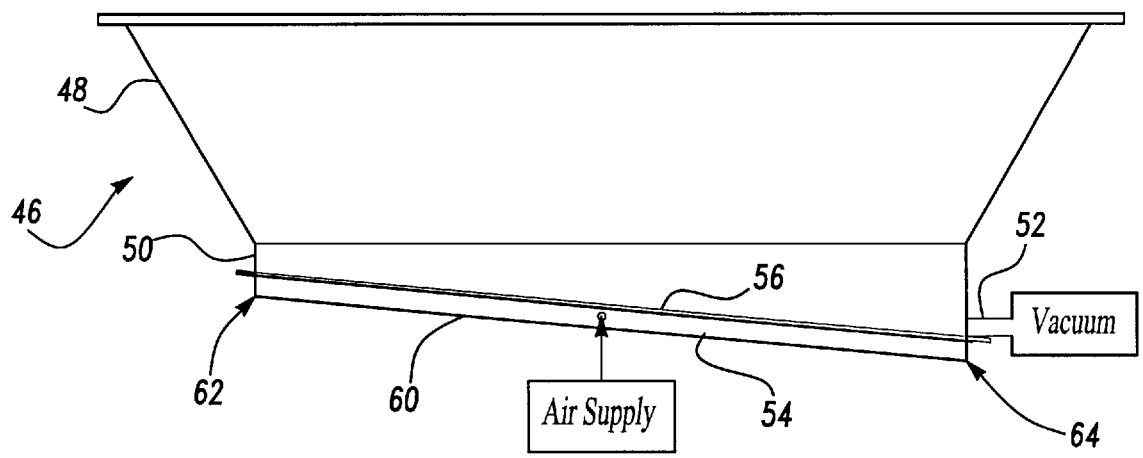
FIG. 3 is a side view of the collector showing the inventive floor.
Figure 4:
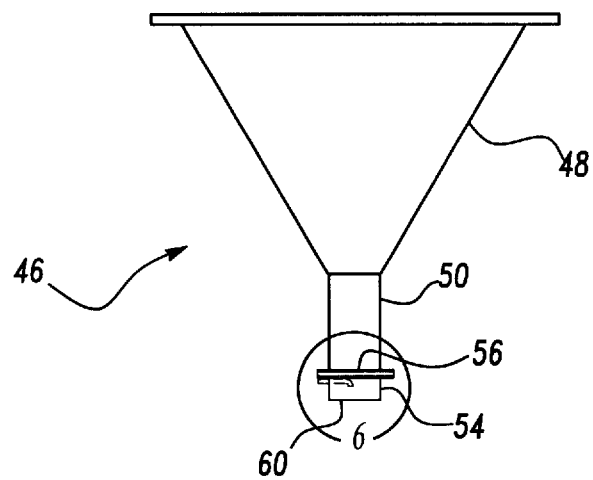
FIG. 4 is a front view of the collector of the subject invention.

Referring to FIGS. 2 through 4, the reclamation collector 46 includes an upper collector chamber 48 for collecting powder paint particles 39 from the application chamber 14. The upper collector chamber 48 funnels the paint particles 39 to a lower collector chamber 50. A vacuum line 52 is operatively connected with the lower collector chamber 50 retrieving the particles 39 from the reclamation collector 46. The vacuum line 52 draws the paint particles 39 from the collector 46 and into a reclamation system (not shown) as is known in the art of powder paint reclamation.

Figure 6:
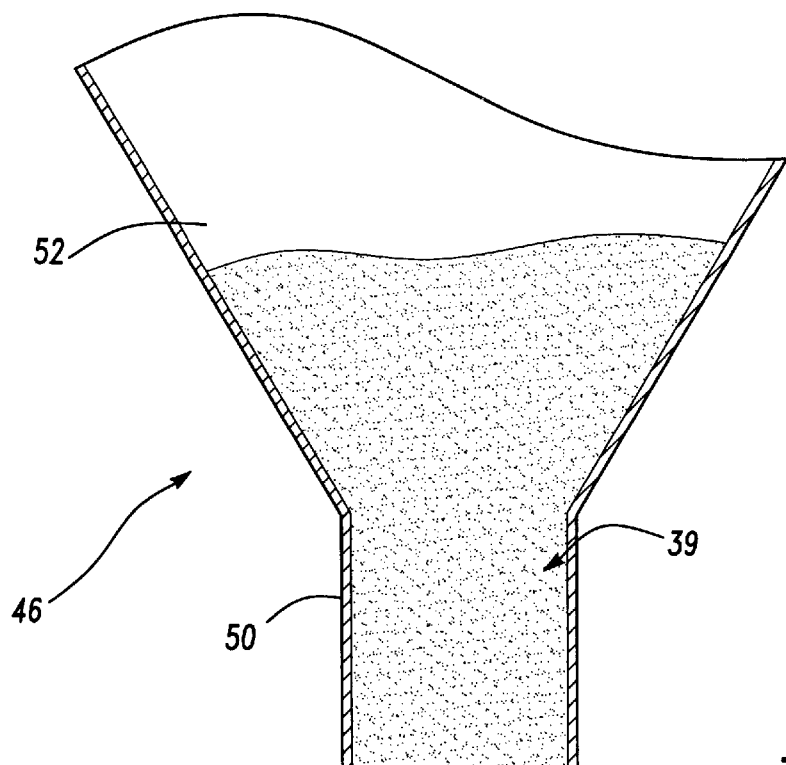
FIG. 6 is a front sectional view showing the lower chamber with the fluidized particles and showing the flow of air through the porous plate.

The reclamation system filters and re-introduces the paint particles 39 to the paint application equipment 18. The powder 39 must be maintained in a fluidized state in order to convey the powder. To maintain the particles 39 in the fluidized state an air chamber 54 is disposed beneath the lower collector chamber 50 for providing fluidizing air to the collector 46 as is best shown in FIG. 6.

The air chamber 54 receives clean, dry, pressurized air from an air supply and communicates with the lower collector chamber 50 through a porous plate 56. The porous plate 56 disperses the fluidizing air providing enough turbulence in the collector 46 to maintain the particles 39 in a fluidized state. The paint particle 39 size typically ranges from 10 to 30 microns. The air supply comprises a single air inlet line 58 that injects pressurized air into the air chamber 54. The air pressure typically ranges from 60 to 80 psi at 10–20 cubic feet per minute, and optimally 15 cubic feet per minute. The air inlet line 58 is angled downward and therefore directs pressurized air towards a floor 60 in the air chamber 54. Deflecting the pressurized air off of the floor 60 dissipates the air throughout the air chamber 54, which improves the fluidizing properties of the air stream as it passes through the porous plate 56.

The porous plate 56 has a plurality of openings or pores therethrough each having a diameter substantially less than the diameter of the paint particles which, as set forth above, typically have a particle size of 10 to 30 microns. Of course, the plate must also be semi-permeable to permit the air to bubble through the plate to suspend or fluidize the paint particles as described. A suitable porous plate for this application is a high density polyethylene porous plate available from Porex Technologies of Fairburn, Ga., which has been used for fluidizing powder coatings and material handling applications.

The floor 60 angles downward from the lower collector chamber 50 at an angle of at least four degrees from horizontal. Preferably, the floor 60 angles downward at least five degrees from horizontal. The porous plate 56 angles downward from the lower collector chamber 50 in a substantially parallel relationship to the floor 60. Therefore, both the floor 60 and the porous plate 56 angle downward at an angle of at least four degrees and preferably at least five degrees. Although the minimum downwardly inclined angle for the porous plate is known from prototype testing, the maximum angle will depend upon the application, particularly including the space available for the underbooth collectors, providing a practical limit. It is believed that a 60° downwardly inclined angle would be suitable if the space is available; however, a maximum angle than 45° or less would be more practical.

The lower collector chamber 50 and the air chamber 54 together form an elongated cell ranging approximately six to eight feet in length and approximately five to seven inches in width. Obviously, the dimensions outside this range can be chosen to meet the specific requirements of a powder paint application process. The length to width ratio ranges between 10 and 20. The preferred ratio is about fifteen.

The floor 60 includes a first end 62 and a second end 64. The first end 62 is higher than the second end 64. The vacuum line 52 connects with the lower collector chamber 50 at the second end 64. The transfer of fluidized paint particles 39 into the vacuum line 52 from the collector 46 is improved when the floor 60 and the porous plate 56 slant downwardly towards the vacuum line 52.

The air inlet line 58 is positioned between the first end 62 and the second end 64. Further, the air inlet line 58 is positioned below the first end 62 and above the second end 64. This angular relationship along with the chamber volume allows for the use of a single air inlet line 58. With a flat or horizontal floor and horizontal porous plate, three, four, or more air inlet lines 58 are required to provide enough fluidizing air pressure to the collector 46 to effectively recirculate the paint particles 39. As set forth above, in the preferred embodiment. The distance between the porous plate 56 and the floor 60 is about 3 inches or less to obtain uniform suspension of the paint using normally available air pressure.

The inventive features included in the collector 46 provides the ability to increase the length and overall size of the collector 46 over currently available collectors. Increasing the size of the collectors 46 reduces the number of collectors required in a particular assembly 10 thereby reducing the installation costs of the assembly 10. Further, utilizing a single air inlet line 58 reduces the installation costs of the assembly 10 and reduces the amount of maintenance required to keep the assembly 10 operational. By inclining the porous plate 56 and the floor 60 of the collector downwardly, preferably in parallel relation, and directing the outlet of the air nozzle 58 downwardly toward the floor 60, multiple air inlets into the chamber 54 may be eliminated and the size of the collector may be significantly increased as described above.

Figure 5:
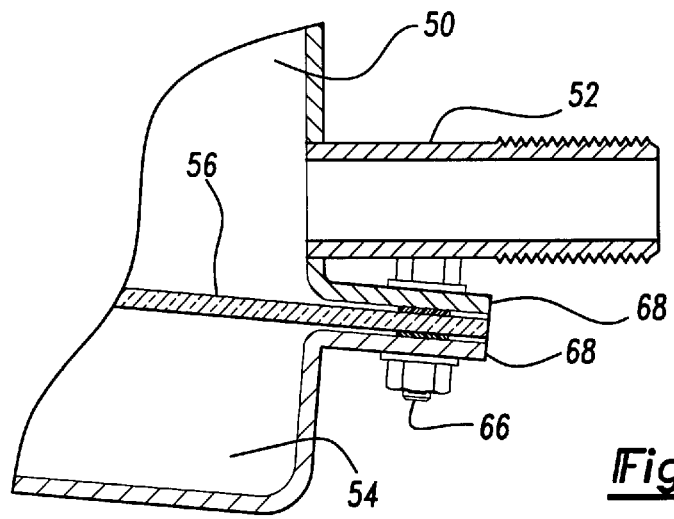
FIG. 5 is partial sectional view of the collector showing the vacuum line and fastener used to secure the porous plate.

Referring to FIGS. 5 and 6, the porous plate 56 is affixed to the collector with at least one fastener 66. Preferably, a plurality of fasteners 66 will be spaced around the length of the collector 46. The fasteners 66 are inserted through a pair of flanges 68 that seal to the plate 56 thereby securing the air chamber 54 and the plate 56 to the collector 46. The fasteners 66 allow for the plate 56 to be removed for maintenance and cleaning.

Figure 7:
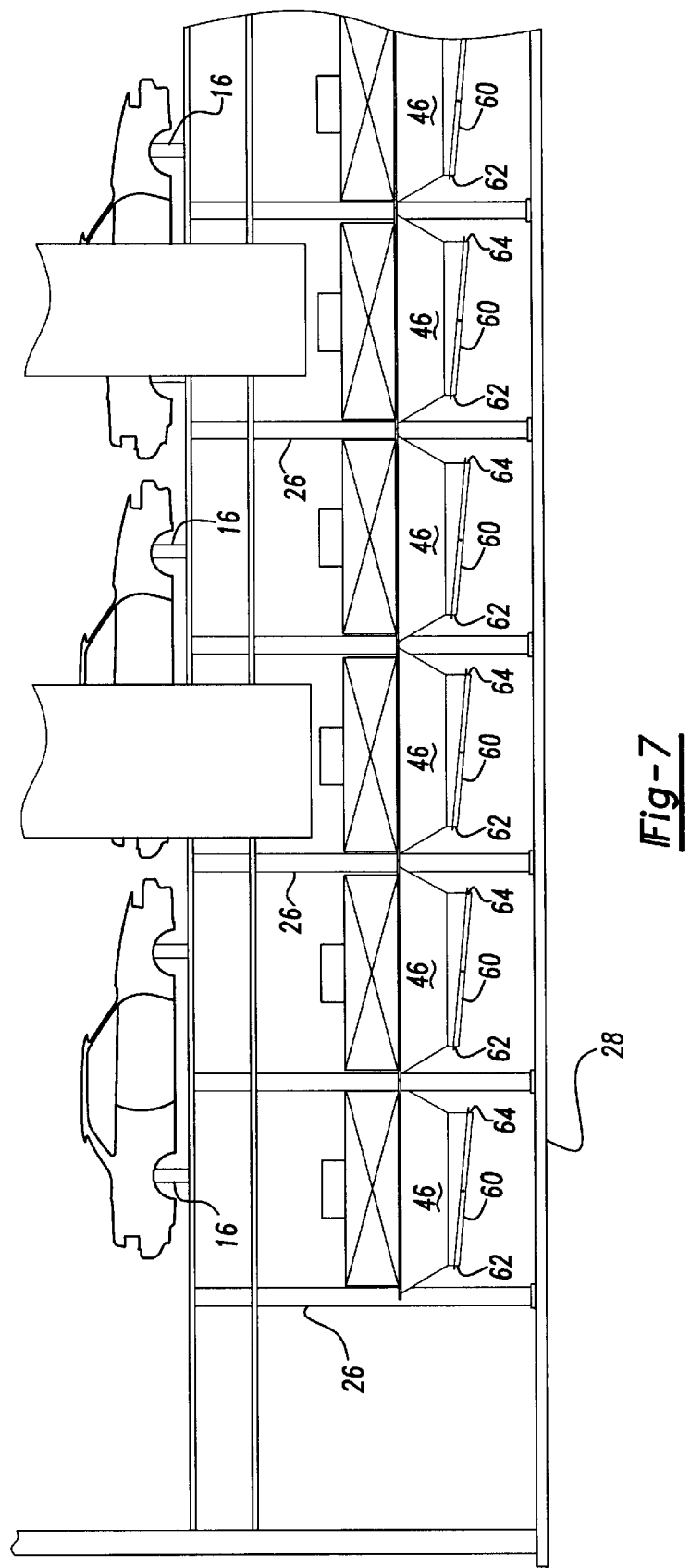
FIG. 7 is a partial side view of the booth assembly showing the inventive collectors positioned along the entire length of the assembly.

Referring to FIG. 7, a plurality of collectors 46 are spaced along the entire length of the assembly 10. Each collector 46, or each series of collectors 46 collect paint particles from different zones of the assembly 10. For example, three collectors 46 can be positioned beneath a bell zone, four collectors 46 can be positioned beneath a robot zone, two collectors 46 can be positioned beneath an observation zone, and each zone can be separated by single collector 46.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A powder paint reclamation collector comprising:
   an upper chamber for collecting powder paint particles from a paint booth;
   a lower chamber communicating with said upper chamber receiving the paint particles from said upper chamber;
   a vacuum line communicating with said lower chamber retrieving the particles from said collector;
   an air chamber having a floor and receiving pressurized air from an air supply, said air chamber communicating with said lower chamber through a porous plate, said pressurized air in said air chamber diffusing through said porous plate into said lower and said upper chambers thereby fluidizing the paint particles disposed in said chambers; and
   said floor and said porous plate angling downward from said lower chamber towards said vacuum line.

2. A collector as set forth in claim 1 wherein said porous plate angles downward from said upper chamber substantially parallel to said floor.

3. A collector as set forth in claim 2 wherein said floor and said porous plate angle downward of at least four degrees from horizontal.

4. A collector as set forth in claim 3 wherein said floor includes a first end and a second end, said first end being positioned above said second end.

5. A collector as set forth in claim 4 wherein said vacuum line communicates with said lower chamber at a position lower than said first end.

6. A collector as set forth in claim 4 wherein said air supply comprises a single air inlet line.

7. A collector as set forth in claim 6 wherein said air inlet line is positioned intermediate between said first end and said second end.

8. A collector as set forth in claim 7 wherein said air inlet line is positioned belong said first end and above said second end.

9. A collector as set forth in claim 8 wherein said air inlet line directs pressurized air towards said floor.

10. A collector as set forth in claim 9 wherein said porous plate is affixed to said collector with at least one fastener.

11. A collector as set forth in claim 1 wherein said lower chamber includes a length to width ratio ranging from ten to twenty.

12. An assembly as set forth in claim 1 wherein the distance between said porous plate and said floor is less than about 4 inches and said air chamber includes a single inlet from said air supply.

13. A booth assembly for painting a product with powder paint comprising:
    a paint application chamber wherein powder paint is applied to the product;
    a plurality of reclamation collectors spaced beneath said application chamber receiving paint particles from said application chamber;
    each of said reclamation collectors having:
    an upper chamber for collecting powder paint particles from said paint booth;
    a lower chamber connected with said upper chamber receiving the particles from said upper chamber;
    a vacuum line connected to said lower chamber retrieving the particles from said collector;
    an air chamber having a floor and receiving pressurized air from an air supply, said air chamber communicating with said lower chamber through a porous plate, said pressurized air in said air chamber diffusing through said porous plate into said lower and said upper chambers from said air chamber through said porous plate thereby fluidizing the paint particles disposed in said chambers; and
    said floor and said porous plate angling downward from said lower chamber towards said vacuum line.

14. An assembly as set forth in claim 13 wherein said porous plate angles downward from said lower chamber substantially parallel to said floor.

15. An assembly as set forth in claim 14 wherein said floor and said porous plate angle downward at least four degrees from horizontal.

16. An assembly as set forth in claim 15 wherein said floor includes a first end and a second end, said first end being positioned above said second end.

17. An assembly as set forth in claim 16 wherein said vacuum line connects with said lower chamber at a position lower than said first end.

18. An assembly as set forth in claim 17 wherein said air supply comprises a single air inlet line.

19. An assembly as set forth in claim 18 wherein said air inlet line is positioned intermediate between said first end and said second end.

20. An assembly as set forth in claim 19 wherein said air inlet line is positioned below said first end and above said second end.

21. An assembly as set forth in claim 20 wherein said air inlet line directs pressurized air towards said floor.

22. An assembly as set forth in claim 21 wherein said porous plate is affixed to said collector with at least one fastener.

23. An assembly as set forth in claim 22 wherein said lower chamber includes a length to width ratio ranging from ten to twenty.

24. A powder paint reclamation collector, comprising:

an upper chamber for collecting powder paint particles from a paint booth;

a lower chamber communicating with said upper chamber receiving paint particles from said upper chamber having an inclined bottom wall;

an inclined porous plate in said lower chamber spaced from said inclined bottom wall extending generally parallel to said inclined bottom wall and defining a pressure chamber between said inclined bottom wall and said porous plate, said inclined porous plate having openings therethrough of a diameter substantially less than the particle size of said powder paint particles permitting air to pass therethrough;

an air pressure inlet line directing air under pressure into said pressure chamber toward said inclined bottom wall, suspending paint particles received on said inclined porous plate; and a vacuum paint particle return line communicating with said lower chamber above said porous plate adjacent the lower extent of said inclined porous plate.

25. The powder paint reclamation collector as defined in claim 24, wherein said lower chamber inclined bottom wall and said inclined porous plate are angled downwardly toward said vacuum paint particle return line at an angle of five degrees from horizontal or greater.

26. The powder paint reclamation collector defined in claim 25, wherein said air pressure line is positioned approximately at the center of said pressure chamber.

27. The powder paint reclamation collector as defined in claim 24, wherein the length of said inclined bottom wall of said lower chamber is at least six feet and the length to width ratio of said inclined bottom wall is between ten and twenty.

* * * * *